(12) United States Patent
Pachikov

(10) Patent No.: US 7,783,594 B1
(45) Date of Patent: Aug. 24, 2010

(54) SYSTEM AND METHOD FOR ENABLING INDIVIDUALS TO SELECT DESIRED AUDIO

(75) Inventor: Stepan Pachikov, New York City, NY (US)

(73) Assignee: EverNote Corp., Mountain View, CA (US)

( * ) Notice: Subject to any disclaimer, the term of this patent is extended or adjusted under 35 U.S.C. 154(b) by 388 days.

(21) Appl. No.: 11/215,692

(22) Filed: Aug. 29, 2005

(51) Int. Cl.
*G06F 17/00* (2006.01)

(52) U.S. Cl. .......................................... 707/609; 84/623

(58) Field of Classification Search ........................ None
See application file for complete search history.

(56) References Cited

U.S. PATENT DOCUMENTS

| | | | | |
|---|---|---|---|---|
| 6,157,724 | A * | 12/2000 | Kawakami | 381/63 |
| 7,177,800 | B2 * | 2/2007 | Wailers | 704/201 |
| 2005/0012759 | A1 * | 1/2005 | Valmiki et al. | 345/629 |
| 2005/0050557 | A1 * | 3/2005 | Gabryjelski et al. | 720/600 |
| 2005/0065780 | A1 * | 3/2005 | Wiser et al. | 704/201 |
| 2005/0088981 | A1 * | 4/2005 | Woodruff et al. | 370/260 |
| 2005/0271219 | A1 * | 12/2005 | Bruelle-Drews | 381/86 |
| 2006/0218187 | A1 * | 9/2006 | Plastina et al. | 707/104.1 |

* cited by examiner

*Primary Examiner*—Don Wong
*Assistant Examiner*—Belinda Xue
(74) *Attorney, Agent, or Firm*—Blakely, Sokoloff Taylor & Zafman, LLP

(57) ABSTRACT

Audio item(s) that may be of interest to a user can be selected from a larger collection of audio items. The audio items of interest may be identified by concurrently generating audio from each item in the collection. The audio generated from individual items in the collection may be generated such that the audio is audibly and selectably differentiable from the audio generated from other items in the collection. A user-input may be detected that corresponds to a selection of a subset of the audio items. A user-input may be detected that modifies characteristics of the audio presentation in space and/or volume. A correlation between the input and the selected audio may be made through characteristics that are incorporated into the selected audio when that audio is made distinguishable.

22 Claims, 7 Drawing Sheets

SYSTEM AND METHOD FOR ENABLING INDIVIDUALS TO SELECT DESIRED AUDIO

TECHNICAL FIELD

The disclosed embodiments relate generally to the field of sound processing. In particular, the disclosed embodiments relate to a system and method for enabling individuals to select desired audio.

BACKGROUND

There are numerous applications and devices that allow users to select and hear desired audio. On hardware, examples of existing devices for audio selection and playback include musical players (e.g. those devices that play musical CDs), answering machines, dictation devices, and devices that execute audio recording and/or playback applications. Other examples include software applications that store audio files in various data types (e.g. wav, mp3), playback music or voice files, and allow for search and playback of desired audio.

Generally, these devices and applications provide information about stored audio files and data items to enable users to select what audio they wish to listen to at any particular moment. This information may be provided in the form of metadata and/or text based information, or visual based information. For example, voice files and memorandums may be viewed in a directory format to see information about the voice files, including the title, date of creation or modification, and associated metadata information. Information about musical files may also be listed in graphical user-interfaces or device interfaces. In these cases, the user must view information related to individual audio items, then select his or her desired audio.

Search and playback services and applications do exist. Such services and applications rely on the user to enter search criteria information. The search criteria is then compared to metadata and other related information about the files in order to determine what audio the user wishes to listen to.

In the generic cases described, the user must rely on information other than the actual audio data in order to make his determination as to what audio file or item corresponds to his desired audio. In some applications, the presentation of metadata information is very efficient for enabling the user to select audio. For example, information presented about music in digital music devices and software players allows users to locate and play desired music by song title, track information, and other identifying information.

However, in other applications, the metadata information is limited. For example, voice files and memorandums contain very little identifying information, unless the user manually inserts information to subsequently be able to identify such files. Likewise, the growth of voice over Internet Protocol (VoIP) has increased the use of the personal computers as telephones. In VoIP, the personal computer stores telephone messages for the user. In these applications, the number of voice files may become large, and the means for users to identify individual voice files is limited to the users viewing cryptic metadata and/or playing individual files, one at a time.

DETAILED DESCRIPTION

Figure 1:
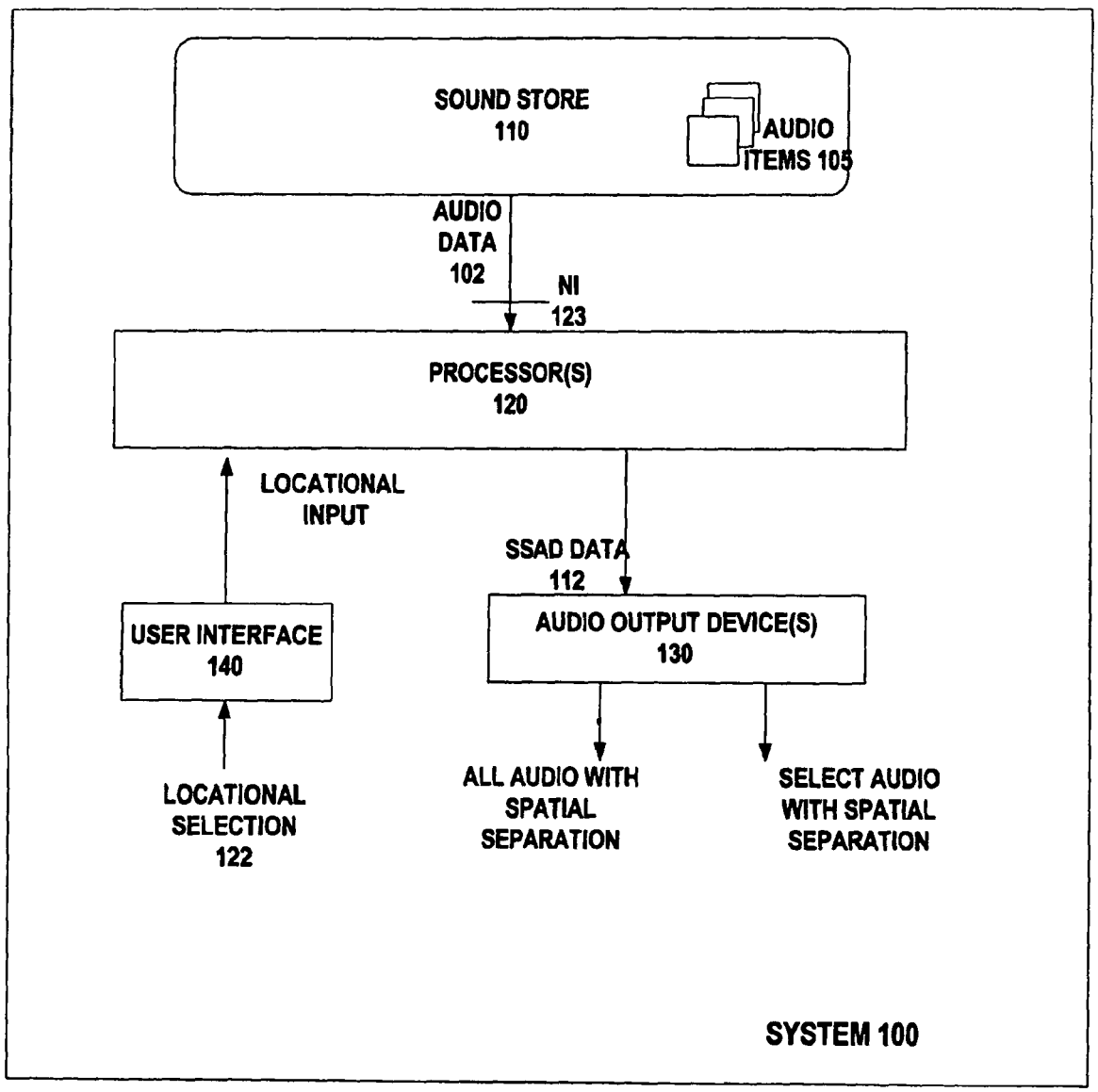
FIG. 1 illustrates a system for enabling individuals to select a particular audio output from a collection of audio outputs, under an embodiment of the invention.

Embodiments of the invention enable individuals to select individual audio items from a larger collection of audio items through a process that includes hearing the audio provided by the individual audio items at one time. Embodiments such as described enable users to locate and identify desired audio very rapidly, through a process that includes listening to the audio from all of the audio items in a given collection or set at once. As such, users do not need to identify desired audio through cryptic metadata information, or associated information which is secondary to what the audio items actually contain.

Numerous advantages may become apparent to embodiments described herein. Among these advantages, in applications where metadata information has limited identifying value, the user can listen to what is contained in the individual audio items in order to make his or her selection. Furthermore, as will be described, the selection of desired audio can be made very rapidly.

Overview

Embodiments of the invention enable a person to locate desired audio from a collection of audio through use of the actual audio data contained in the collection of audio. According to an embodiment, audio is generated from the each of an audio item in a collection. The generated audio is outputted concurrently to the user. Furthermore, the generated audio from individual audio items is made distinguishable from audio generated from other audio items. This allows the user to perceive a difference in what he or she hears from all of the audio items in the collection. The user can respond to the perceived difference by making a selection of audio items. The selection of audio items may identify some audio items as candidates of interest, while eliminating other audio items as candidates. If necessary, this process can be repeated in succession until the user's desired audio is identified.

Embodiments of the invention provide a method and technique for identifying audio item(s) that may be of interest to a user from a larger collection of audio items. The audio items of interest may be identified by concurrently generating audio from each item in the collection. The audio generated from individual items in the collection may be generated such that the audio is audibly and selectably differentiable from the audio generated from other items in the collection. A user-input may be detected that corresponds to a selection of a subset of the audio items. A correlation between the input and the selected audio may be made through characteristics that are incorporated into the selected audio when that audio is made distinguishable.

The expression "audibly and selectably differentiable" means that the audio from one audio item can be heard and differentiated from the audio from another audio item that is concurrently generated.

In an embodiment, audio from a first subset of the audio items in the collection are made spatially distinguishable from audio generated from a second set of audio items in the collection. The use of the expression "spatially distinguishable" in the context of sound or audio is intended to mean that sounds generated from a first audio item (e.g. file) are made to have a different perceived location from the sounds generated from a second audio item. In particular, one or more embodiments provide that audio generated from different files or other data sources are spatially distinguishable when the audio from each item is (i) outputted from a different physical location (e.g. different speakers), (ii) is manipulated (e.g. through phase-shifting the generated audio through different outlets) to have a different apparent source position or origin from which the sound is perceived to have originated, and/or (iii) is manipulated to have a different arrival direction to the user from the audio of the other sources. Thus, for example, audio from one audio item is spatially distinguishable from audio of another audio item if the respective audio of the two audio items have either different arrival directions and/or apparent source positions. The source position may correspond to the position where a sound is perceived as being generated from. The arrival direction may correspond to a direction (perceived or actual) that a person detects a sound as coming from. Still, other mechanisms and techniques for creating spatially distinguishable audio is contemplated.

An embodiment may be implemented as a system comprising a retrieval component, a signal processing component, and a user-interface. The retrieval component may be configured to retrieve a collection of audio items from one or more storage mediums. The signal processing component may be configured to generate audio corresponding from each audio item in the collection. The signal processing component may also spatially distinguish the audio generated from one or more audio items in the collection from the audio generated from one or more other audio items in the collection. The user-interface may be configured to enable the user to select the spatially distinguishable audio generated from a first subset of one or more audio items in the collection of audio items.

As used herein, the term "audio item" means a data source for generating audio. Examples of audio items include data files and portions of files.

One or more embodiments described herein may be implemented, in whole or in part, through the use of modules. A module may include a program, a subroutine, a portion of a program, a software component or a hardware component capable of performing a stated task or function. As used herein, a module can exist on a hardware component such as a computer system independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1 illustrates a system for enabling individuals to select a particular audio output from a collection of audio outputs, under an embodiment of the invention. A system 100 of hardware components is shown to include a sound store 110, one or more processors 120, an audio output device 130, and a user-interface 140. The system 100 may be implemented in numerous settings, including on a standalone device (e.g. answering machine), desktop computer, network enabled device, or service (music or voicemail service). As such, components such as audio output device 130 and user-interface 140 may correspond to any one of numerous types of devices, mechanisms or features. In one embodiment, the audio output device 130 corresponds to a multi-channel audio outlet component, such as stereo enabled speaker(s), Surround Sound, or multi-speaker system. Likewise, the user-interface 140 may be implemented through any hardware/firmware (e.g. push button device) and/or software (e.g. graphic user-interface (GUI)).

The components of system 100 may be interconnected through any one of a plurality of mediums. For example, a network (local or wide-area such as the Internet) may couple the audio output device 130 with some of the processors 120 and the sound store 110. In such a scenario, the processors 120 may communicate across the network with the sound medium 110 using a network interface 123 or data port. Alternatively, the components of system 100 may be locally connected, using serial ports, or integrated into a single device. For example, system 100 may be implemented entirely on a desktop computer, on a standalone device (e.g. answering machine), or on a mobile computing device.

The sound store 110 holds audio data. The particular type and characteristics of the sound store depends on the setting in which an embodiment of the invention is implemented. For example, sound store 110 may correspond to a memory medium (e.g. hard disk, flash memory) on which a plurality of audio files are stored. Alternatively, the sound store 110 may correspond to an optical storage medium, such as a CD-Rom, that is inserted in a playback device. Any type of audio or sound data may be contained as data items in the sound medium. For example, in one implementation, the sound medium contains files containing voice data from the recorded memorandums of a user. In another implementation, the sound medium contains voicemail messages of a user, or a musical collection provided on a CD-Rom. Numerous types of audio content are contemplated by embodiments described herein, such as, for example: voice notes or memos, voicemail, email attachments with audio, MP3 or other music files, audio books, language learning lessons, non-musical sounds (e.g. nature or industrial). Numerous types of mediums on which the sound is provided or retrieved from are also contemplated, including audio files stored locally on digital or analog medium, or audio content streamed or provided from a network. Audio content may also be provided from one file, and broken into segments, or from one analog source (e.g. tape).

According to an embodiment, one or more processors 120 are configured to retrieve audio data 102 from the sound medium 110, and to configure or convert the audio data into spatially distinguishable sound waves. As will be described, two spatially distinct sounds are generated from the audio data 102 to give a listener the perception that the two sounds originate from different locations, or come from different arrival directions. In one embodiment, the spatial distinction between audio of different items is established by phase-shifting the audio of an individual audio as that audio is transmitted through different locations and/or channels of the output device 130. For example, the output device 130 may comprise two speakers. A portion of the audio transmitted through one of the speakers may be phase-shifted with respect to another portion of the audio generated from the same audio item that is outputted through another one of the speakers. It should be noted that, throughout embodiments, implementations and examples described in this application in which the act of phase-shifting audio to create distinguishable sounds is described, other techniques may be substituted to create imitations of stereo or surround-sound or three-dimensional effects. The slight phase-shift of audio through different speaker locations yields a phase differentiation to the user. The brain of the user inherently translates this phase difference into an arrival direction and/or source position that is different than had there been no phase-shift of the audio through the same audio output device 130. The audio generated from some or all of the audio items may be phase-shifted in this manner, so that each audio item is heard by the user with a perceived location (e.g. radial position, depth/distance) or arrival direction that is different from what would be otherwise be provided with no phase-shifting of the audio items. As will be described elsewhere in this application, other audio manipulation techniques may be used to create the spatial separation of the different audio items. These include volume shifting audio from individual audio items, using disparate output locations for the audio of the different audio items, and using echo or audio reflection. These alternative techniques may be used in combination with phase-shifting techniques, or separately.

In one implementation, the spatial distinctions created by a system such as described by FIG. 1 may correspond to two apparent source positions and/or arrival directions for the different sounds that are generated from the data of the sound medium 110. In another implementation, numerous apparent source positions and/or arrival directions are generated for the audio data. For example, a set of multiple audio files (or other items) may be retrieved at any given moment from the sound medium 110. Audio from each of the retrieved audio items may be manipulated (e.g. by phase-shifting the audio through different outlets) to spatially separate apparent source position/arrival directions of the different audio items.

According to an embodiment, the spatially separated audio from the different audio items may be outputted at one time to the user. Thus, for example, the user may hear the sounds from ten audio files or songs at one time, where the ten files or songs have two or more apparent arrival directions and/or source positions for the user. To further the example, the user may hear the ten files being played with different spatial characteristics (e.g. arrival direction or source position), or alternatively having ten or more spatial characteristics.

The spatially separated audio may be generated by the processors 120 retrieving audio data 102 for a set of data items in the sound medium 110. The processors 120 phase-shift or otherwise signal process audio data that can be outputted to render spatially distinct sounds. This spatially separated audio data (SSAD) 112 may be transmitted to audio output device 130, which then converts the SSAD 112 to audio. In one implementation, the audio output device 130 may correspond to stereo or multi-channel speakers that generate audio from digital audio data. The audio data device 130 may generate spatially separated audio waves from SSAD 112 based on signal processing provided by the processors 120.

Once spatially separated audio waves are outputted to the user, an embodiment of the invention provides that the user can enter some form of locational (e.g. distance/depth and/or radial) selection 122 in order to select one or more audio items from the collection that are being outputted at one time. The user may base the selection on his or her perception of the apparent origin of a particular audio of interested. Thus, for example, if ten audio items are being outputted at one time in a manner that provides two apparent origins, the user may select one of the two apparent origins in response to detecting one of the audio waves being of interest. As another example, the ten audio items may be outputted to have ten apparent origins, and the user's locational selection 122 may select one of the apparent origins. In either case, the locational selection 122 may be provided through the user-interface 130. The act of the user's selection may be communicated in numerous ways, such as through volume adjustment by the user (the user turns the volume up when he locates a sound of interest). The user-interface 130 may be any one of numerous types of interfaces. For example, user-interface 130 may be in the form of a graphic user interface (GUI) that the user can manipulate with commands entered through, for example, a pointer, keyboard or voice. Other examples of user-interface 130 include button controls (e.g. like a remote control) or sensor perception of the user's movement (sensor that detects a user's movement). The user-interface 130 may forward the locational selection 122 as input 132 to the one or more processors 120. It should also be noted that the user may enter other forms of input that are not necessarily "directional", such as for, example, position information (see e.g. FIG. 7B) where depth or distance can be specified by the user.

The processors 120 may use the input 132 to select data items from the plurality of data items that are being used to output audio at that time. In one embodiment, the user's directional selection is determinative of what audio the user wishes to hear. In another embodiment, the user's directional selection only reduces the number of audio that are candidates for the user's interest. In the latter case, the remaining audio that is concurrently outputted to the user (after audio from other items have been removed) may be manipulated again to be spatially separated across the original spectrum of separation. Thus, fewer audio may be outputted to the user at one time, but the spatial spectrum of the audio may be unchanged, so that the remaining audio are more clearly distinguishable from one another. Thus, the spatially separated audio 112 may be smaller in terms of the number of data items that the audio corresponds to. The process described in the paragraph may be repeated, with the user making another locational selection 122 through the user-interface 130. Eventually, the user's desired audio may be identified through successive iterations. Once the desired audio is identified, one embodiment provides that the audio is outputted for the user, confirming his selection.

Figure 2:
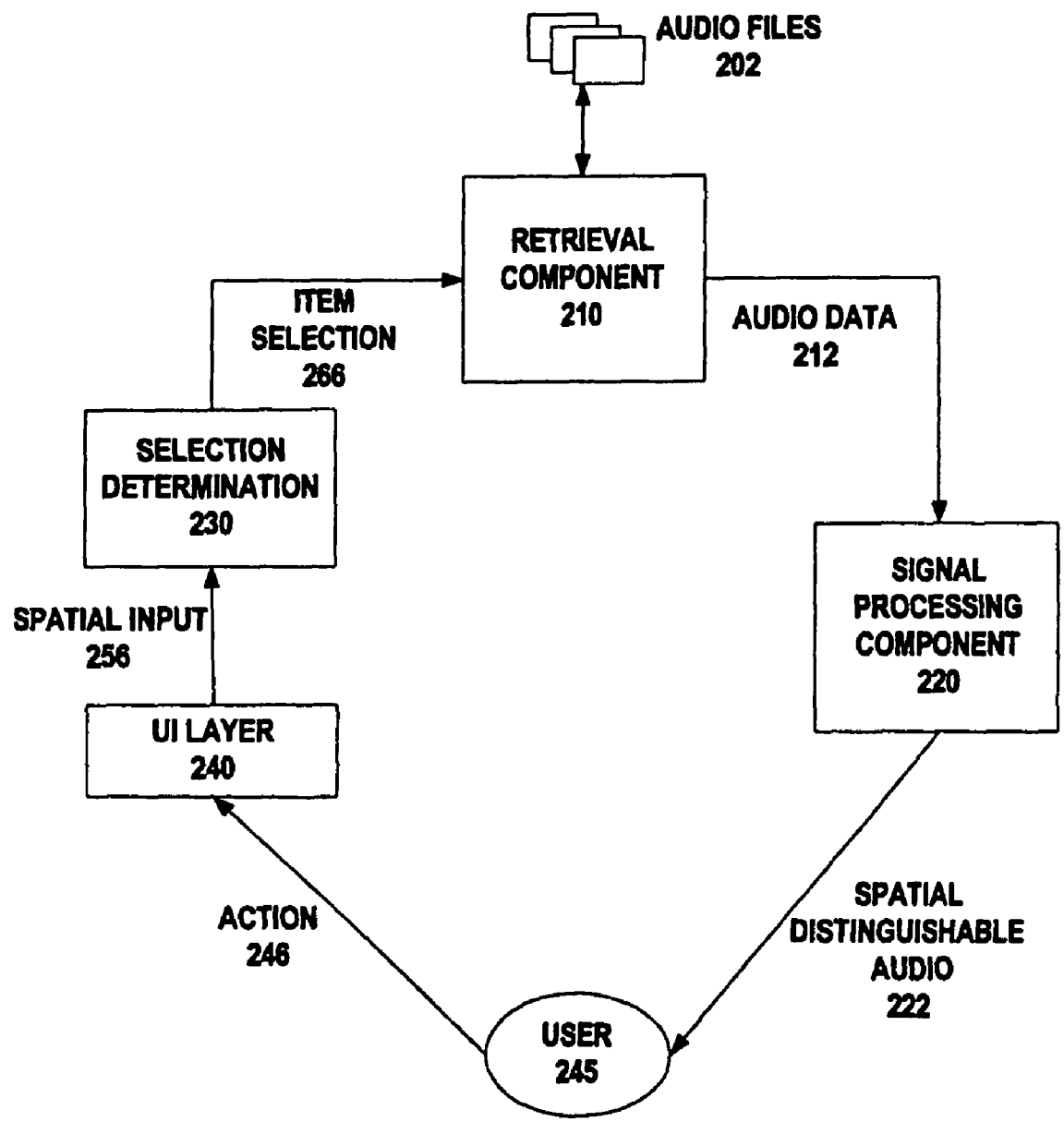
FIG. 2 illustrates programmatic elements that cooperate with one another to enable individuals to select a particular audio item from a collection of audio items, under an embodiment of the invention.

FIG. 2 illustrates programmatic elements that cooperate with one another to enable individuals to select a particular audio item from a collection of audio items, under an embodiment of the invention. The components illustrated in FIG. 2 may be implemented through any programmatic means, including software, hardware or firmware. In one implementation, the components described in FIG. 2 correspond to processes, executed as part of one or more applications, or modules. An embodiment illustrated by FIG. 2 includes a retrieval component 210, a signal processing component 220, a selection determination component 230, and a user-interface layer 240. A user 245 may interact with the components through the user-interface 240.

According to an embodiment, the retrieval component 210 initially identifies audio files that the user desired to inspect and select from. As described in FIG. 1, retrieval component 210 may retrieve the files from one or more audio storage mediums, such as a folder on a hard drive, an optical storage media or other form of storage media, or audio files located at one or more network locations. Initially, data may be retrieved from a collection of audio files 202, to begin a process by which user 245 can select and/or sort. The retrieval component 210 communicates audio data 212 contained in the audio files 202 to the signal processing component 220. The signal processing component 220 generates data for spatially distinguishable audio output 222 from audio data 212. The audio output 222 is then directed to the user 245. At the start, the audio output 222 contains audio from all of the audio files 202.

The audio output 222 directed to the user are spatially distinguishable in that the user correlates a different location or direction of arrival for some or all of the sounds he hears. According to an embodiment, the user perceives the sounds formed by the audio output 222 as coming from different directions. Thus, for example, the user may hear the audio output 222 corresponding to each of the audio files 202 as coming from a separate direction or location. As another example, the user may hear some of the audio output 222 as traveling from one direction, and the rest of the audio output as traveling from another direction. Signal processing component 220 may achieve this affect by phase-shifting the audio data that forms the data of each audio output 222. In one embodiment, data for individual audio outputs 222 is portioned to be emitted from different channels and/or locations, with a phase-shift of the audio from the different locations resulting in the user perceiving a particular spatial characteristic (e.g. source position or arrival direction) of that audio output 222. Individual audio output 222 may be phase-shifted in this manner, so that each audio output has its own spatial characteristic, or alternatively, individual audio outputs are grouped by specific spatial characteristics. In one embodiment, the result of phase-shifting audio output 222 is that the user perceives a difference in the apparent origin or arrival direction of the each audio output that is phase-shifted. Thus, for example, if the audio data 212 from each audio file 202 is distinctly phase-shifted, the resulting audio output 222 may be distinguishable through its perceived arrival direction and origin.

Once the audio output 222 of the different audio items are directed to the user 245, the user may perform an action 246 that is correlated to the arrival direction or perceived origin of the different sounds that he hears. In one embodiment, the user's input indicates a direction or position. Furthermore, the user's input may be either distinct (a specific location or direction) or general (an area). In an implementation where the user's input is distinct, the input may identify a relatively small number of arrival directions or origins. When the user's input is general, numerous arrival directions or origins may be indicated.

The action 246 performed by the user may correspond to any action in that the user-interface 240 can correlate to spatial input. In one embodiment, the user-interface 240 is a graphic user-interface (GUI) providing a directional input object or interactive feature, such as a dial that can be rotated to a plurality of positions. Numerous types of GUIs that can provide the user with the ability to indicate spatial input are contemplated. Likewise, alternative types or mediums for user-interface 240 are contemplated. For example, in one embodiment, the user-interface 240 corresponds to a sensor that detects the hand movements of the user 245. The input action 246 of the user 245 is correlated to spatial input 256 by the user-interface 240. Thus, for example, the user may use a mouse or other pointer device to "click" a radial direction on a GUI object of the user-interface 240, and this is translated into the spatial input 256. In the example provided, the spatial input 256 may correspond to the radial direction of arrival of the sound.

The selection determination component 230 may process the spatial input 256 by correlating the spatial input into a selection 266 of one or more audio of the audio files 202 in the collection. In one embodiment, the selection 266 (particularly when it is the first selection in time) is a sort, in that some of the audio files are identified as being candidates of interest by the user, but not all. To illustrate, if twenty audio files are initially played to the user, the user's first selection may identify three or four. Thus, additional selections may be needed from the user.

In one implementation, the selection 266 may be communicated to the signal processing component 220, which identifies one or more audio files that are of interest to the user. In response to receiving the selection 266, the signal processing component 220 generates data audio output 222 using only selected files. In one embodiment, once the signal processing component 220 receives the selection 266, the spatially distinguishable audio output 222 is from the audio files indicated by the selection 266. Furthermore, the spatially distinguishable audio output 222 may be "spaced" further apart, meaning that the full range of apparent arrival directions or origins may be distributed evenly to the remaining audio output 222, thus making each audio wave more distinguishable for the user.

The user 245 may signal another input action 246, which is correlated by the user-interface 245 into another spatial selection 256. With a second or third iteration, the selection determination component may signal the selection 266 that identifies the particular audio file that the user is interested in. The signal processing component 220 may output only the audio output from that file in response to the final selection 266.

Methodology

Figure 3:
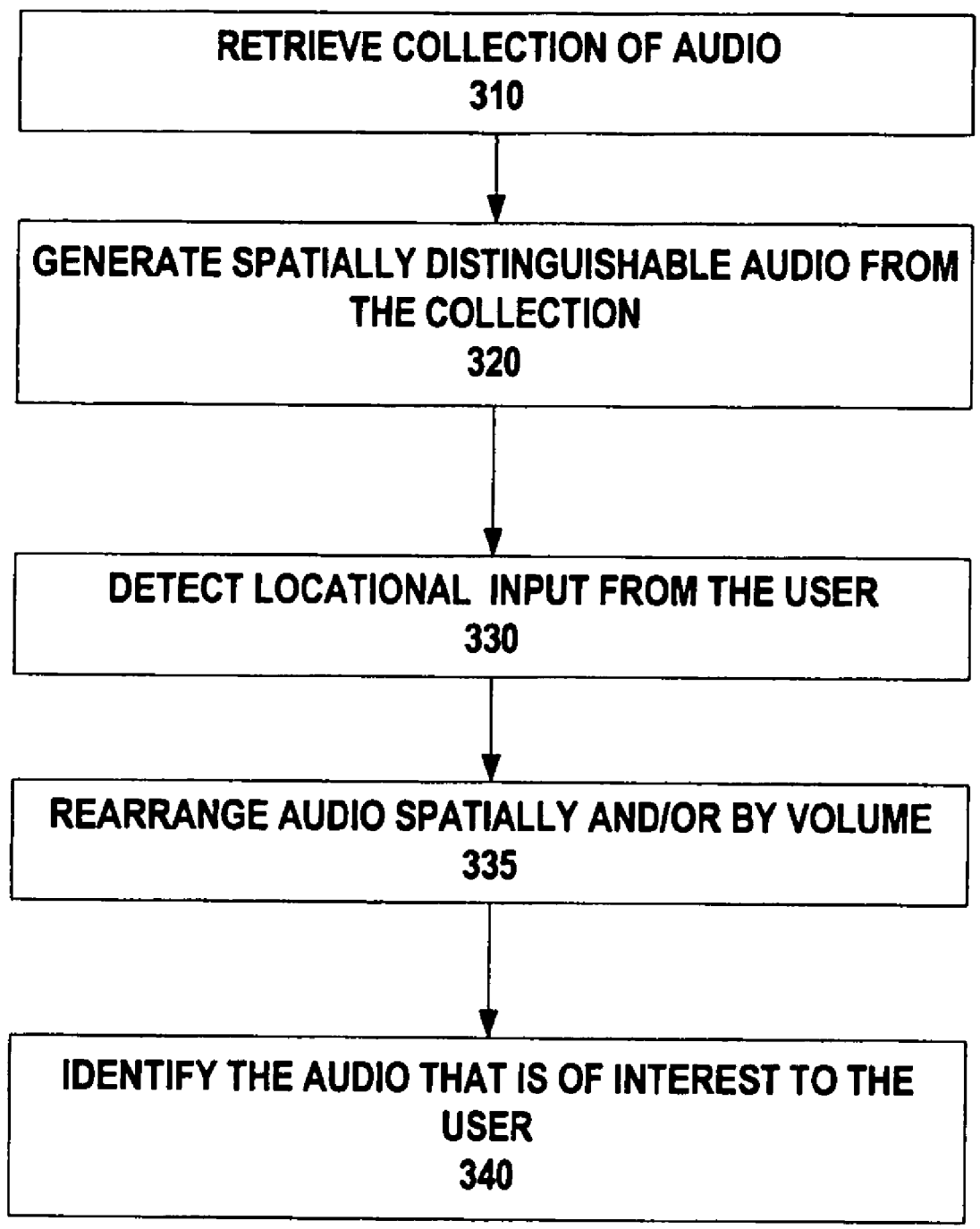
FIG. 3 illustrates a method for enabling a selection of audio from a larger collection of audio, under an embodiment of the invention.
Figure 4:
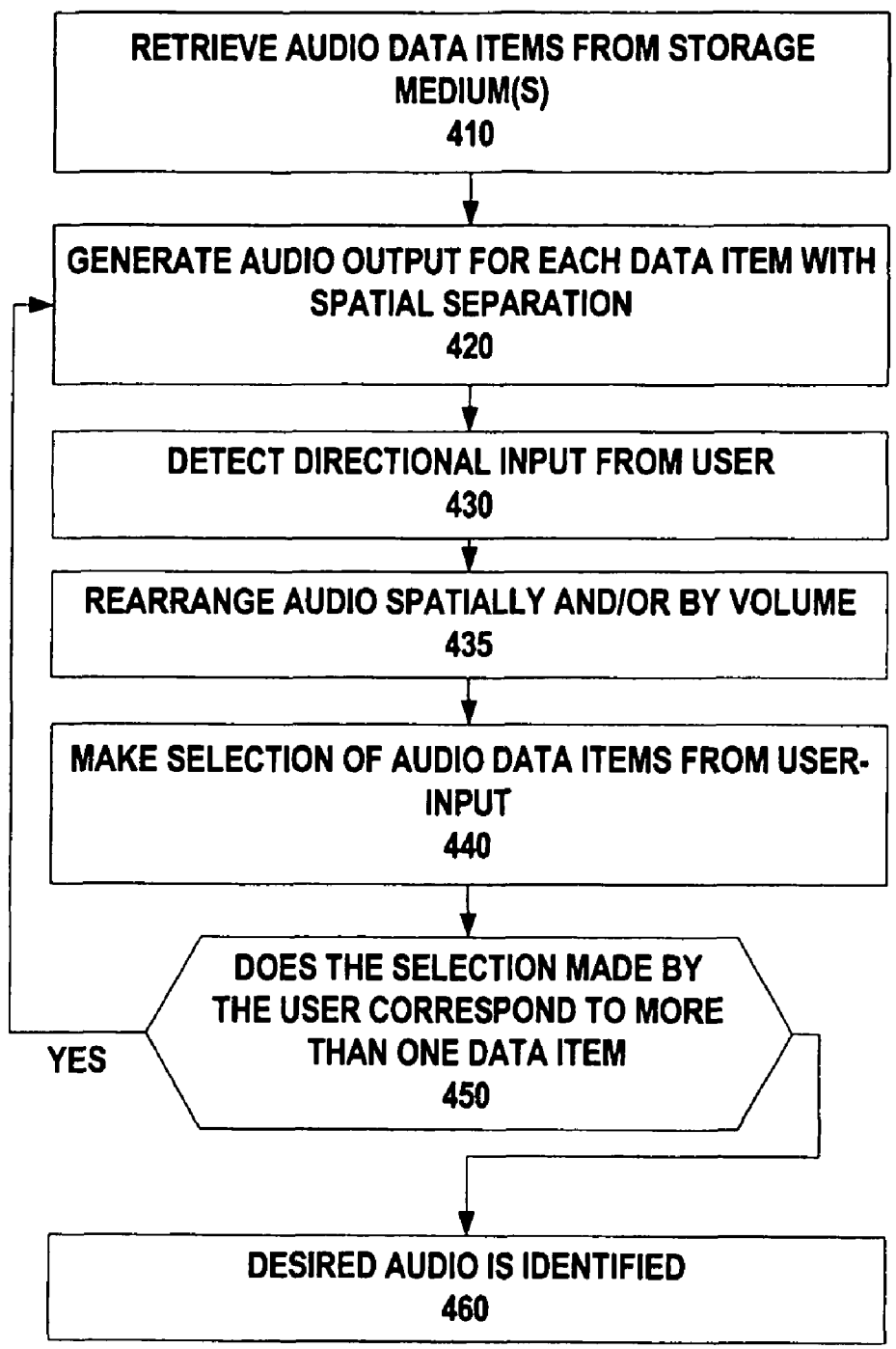
FIG. 4 illustrates a more detailed method for enabling an individual to select a desired audio output, under an embodiment of the invention.

FIG. 3 and FIG. 4 illustrate methods for enabling the selection of audio files by individuals, under embodiments of the invention. In describing the methods of FIGS. 3 and 4, reference may be made to elements of FIGS. 1 and 2 for purpose of illustrating a suitable component or element for performing a step being described. Embodiments described with FIG. 3 and FIG. 4 may be computer-implemented, and steps described with each method may be performed programmatically, and/or through the use of modules.

With reference to FIG. 3, step 310 provides that a desired collection of audio is retrieved. In one embodiment, the desired collection of audio correspond to a plurality of audio files, stored on computer-readable medium(s) and/or on network locations. In another embodiment, one audio file may be retrieved, that is then segmented into multiple data items in this step. For example, a large audio file (e.g. a chapter from an audio book) may be segmented into separate data items as part of this step. Furthermore, as described with other embodiments, numerous other types of audio items may be used as part of an embodiment of the invention.

Step 320 provides that audio from all of the audio items in the collection are concurrently outputted, with audio items or groups of audio items having spatially distinguishable audio from the audio of other items or groups of audio items. For example, the audio from a collection of ten or more audio items may be provided with between two and ten spatially distinct characteristics (e.g. arrival direction or source position).

Step 330 is performed once the user hears the audio from the collection of audio items. In step 330, user-input is detected that indicates directional information from the user. The locational (e.g. directional) information correlates to a direction (or area or space) that the user wishes to indicate as including the arrival direction and/or source position of the particular audio that is being outputted from all of the audio items. In an implementation where the audio from numerous audio items is directed to the user with multiple arrival directions and/or source positions, the user may not know which exact audio item is the one of interest, or the specific arrival direction of the audio from that audio item. However, the user may be able to form an impression that the sound he is interested in is coming from a particular direction or location. The user may be able to make a selection based on this impression.

As an option, step 335 provides that the user can rearrange audio spatially, through selection or other actions. As an alternative to spatial rearrangement, the user's actions may signify an volume rearrangement. The rearrangement of audio may select some audio and exclude others. Following step 335, either step 330 or step 340 may be performed.

In step 340, the user's selection is used to identify one or more audio waves that are either of interest to the user, or candidates for being of interest to the user. In one embodiment, the selection made from the user's input is determinative, in that a specific audio item is identified as being of interest to the user. However, in the case where there are numerous audio files, one selection from the user may be inadequate for determining the particular audio item of interest. As described in previous embodiments, one or more additional selections may be needed in order to identify a single audio item that is of interest to the user, and a first selection may result in the identification of a subset of all of the audio items in the collection.

FIG. 4 illustrates a more detailed method for enabling an individual to select a desired audio output, under an embodiment of the invention. In step 410, audio files and other data items are retrieved from one or more storage mediums. The retrieval may be triggered by, for example, a user-action, a schedule, or some other event.

In step 420, audio output is generated from each of the retrieved audio files. The audio output from each audio file is phase-shifted through separate communication channels and/or outlets, so that the audio from individual items is provided a spatial characteristic (such as perceived source position and/or arrival direction) that is different than what would otherwise be but for the phase-shift. Phase-shifting the audio output from individual audio items or groups of audio items enables the listener to perceive spatial distinctions in the audio from the entire collection. According to an embodiment, the audio from numerous audio items may be phase-shifted, so that the combined audio output from all of the audio files is perceived by the user has having numerous arrival directions and/or apparent origins. The result is that the user hears all the audio outputs at once, and is able to distinguish subsets (one or more) of the audio outputs as coming from corresponding distinct directions or origins. For example, in one implementation, the user may hear sounds from a first set of audio files as coming from a leftward direction, sounds from a second set of audio files as coming from a central direction, and as sounds from a third set of audio files as coming from a rightward direction. In yet another implementation, the sounds from each audio file may be phase-shifted so that the sound of each audio file has a different arrival direction or origin. For example, the perceived source-positions from all of the sounds may form a semi-circle or circumvent the user.

In step 430, a directional input of the user is detected. In one embodiment, the input is directed towards a particular direction. For example, the user's input may indicate a leftward direction, rightward direction, or a central direction. Numerous implementations exist for enabling the user to enter a directional input. For example, the user may enter input through a GUI, or make a hand gesture that is detected by a sensor.

Step 435 provides an optional step for enabling the user to arrange audio following performance of step 430. The rearrangement may be spatially, or alternatively, through volume. Following step 435, either step 430 or step 440 may be performed.

Step 440 provides that a selection of audio files is made from the user's directional input. The selection may have correspondence to the audio item that had its data phase-shifted or otherwise outputted so that its audio had a source position or arrival direction indicated by the user's directional information. In one embodiment, the user's directional input may be interpreted broadly, meaning audio output is phase-shifted to have a particular arrival direction that is generally in the vicinity of the user's directional input are selected. Thus, an embodiment provides that the user's selection results in a subset of the total audio files that were candidates for the user's interest before the selection was made.

Step 450 provides that a determination is made as to whether the subset of audio files indicated by the user's selection has more than one audio file. If there is more than one audio file, the method is repeated for the subset of audio files beginning with step 420. The audio files in the subset are then used to generate audio output for each file, and the audio output from each file is phase-shifted so that the audio outputs from all of the audio files in the subset are produced with two or more arrival directions. This way, the audio output of all the files in the subset may be phase-shifted across the full spectrum that was used initially, when the audio files were retrieved from the storage medium.

If the determination in step 450 is that the identified subset contained only one audio file, then that audio file is designated as being the audio file of interest to the user. In one implementation, that audio file is played back to the user automatically.

With respect to embodiments of FIG. 3 and FIG. 4, audio data items determined to have correspondence with the user's directional information may be outputted with greater volume than the audio files that are not indicated by the directional information. Also, as described in FIG. 7B, the user may specify distance or other locational information in addition to or as an alternative to directional information. Audio data items that are not indicated may in fact be faded or muted. If additional selections are made by the user to determine an audio data item of interest, subsequent selections may cause additional audio items to be muted or faded.

Spatially Distinguishable Audio

Figure 5A:
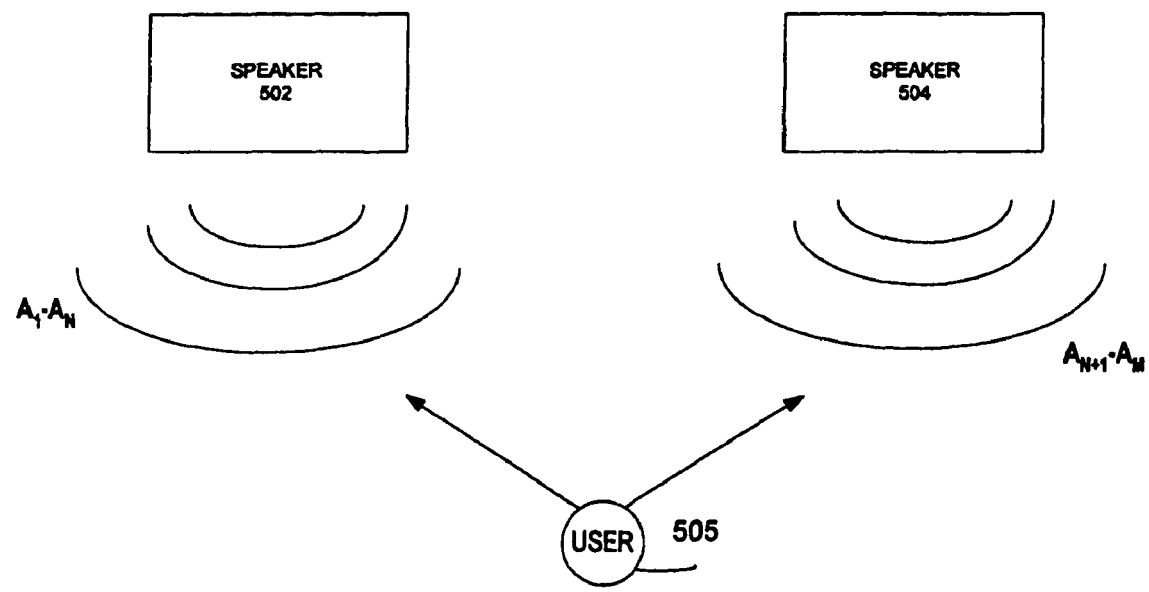
FIG. 5A illustrates a first technique for generating spatially distinguishable audio, under an embodiment of the invention.

Numerous techniques may be implemented to concurrently generate audio from different items, and to make audio from individual items in the collection spatially distinguishable to a listener. FIG. 5A illustrates one technique where speakers 502, 504 are provided at different locations, such as for example, leftward and rightward. A collection of audio items may be played back through the speakers 502, 504. In one implementation, the collection may be divided so that audio from a first set of audio items ($a_1$-$a_n$) are outputted through left speaker 502, while audio from a second set of audio items ($a_n$+$a_{1-m}$) are outputted through the right speaker 504. In this way, all the audio from the different items in the collection are outputted at once, but from different locations. The user 505 can enter directional input from any form of user-interface. For example, the user may enter left or right as input. The set of audio items being played at the particular location is then divided again and played back concurrently through both speakers 502, 504. If the user is still not able to select his desired audio, the process may be repeated as necessary.

Figure 5B:
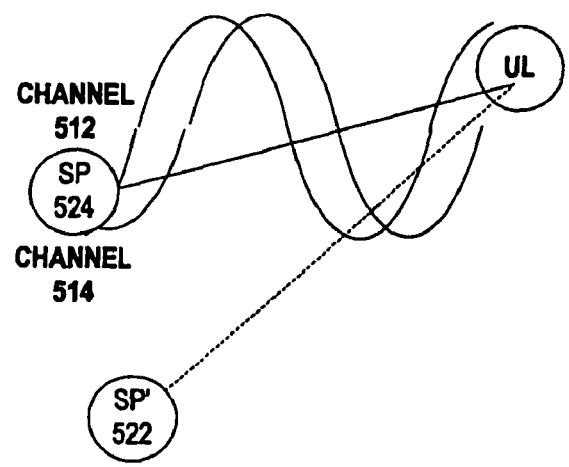
FIG. 5B illustrates another technique for generating spatially distinguishable audio using phase-shifting, under an embodiment of the invention.

FIG. 5B illustrates another technique in which the sound waves in the audio generated from an individual audio item are phase-shifted while being outputted on multiple communication channels 512, 514. The communication channels may correspond to different audio outlets (e.g. speakers), or from communication channels incorporated into one speaker. For example, the audio from one audio item may be phase-shifted as it is transmitted out of a Stereo speaker system, or from multiple speakers. The result is that the same sound transmitted from different locations or channels 512, 514 is heard by the user with a perceptible spatial characteristic that is different than what it otherwise would be had the sound been transmitted from the same channels with no phase-shift. The spatial characteristic may cause the listener to perceive a source position 522 or arrival direction for the sound which is altered by the phase-shift. Thus, perceived source position 522 is displaced from the actual source position 524. Likewise, the perceived arrival direction 532 is different than the actual arrival direction 534. This process can be performed for the audio from numerous audio items, so that when the collection of audio items is played back concurrently, the user perceives a spatial distribution of the source positions and/or arrival directions for all of the individual audio items.

With regard to embodiments described, other audio characteristics may be used to enhance the spatial differentiation in the audio generated from the different audio items. Among these audio characteristics, sound levels may be adjusted to give another dimension in the spatial distinction of the different audio items. For example, the volume from some audio items may be made more faint in order to facilitate the perception of that audio being further away from the user. Other audio characteristics that may be employed include use of echo or audio reflections to enhance spatial distinctions, as well as noise cancellation and bursts to distinguish (spatially or otherwise) the audio from one audio item from another.

Usage Examples

Figure 6A:
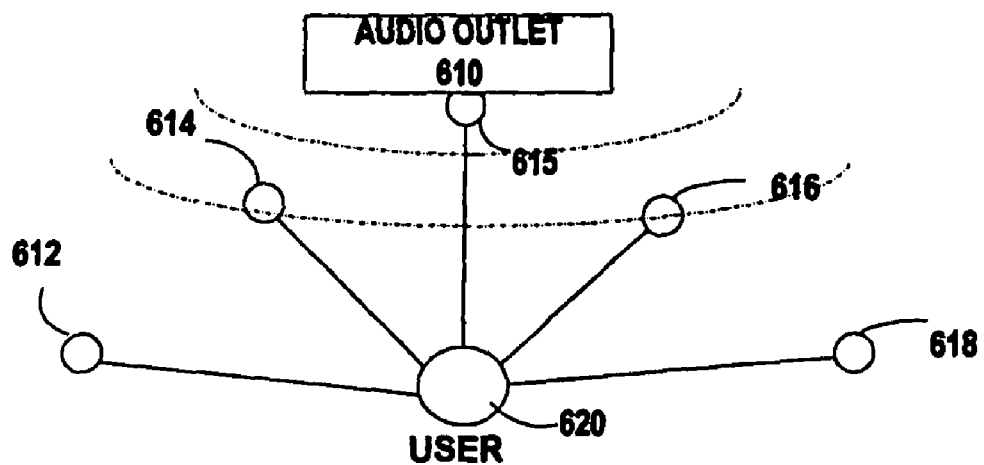
FIG. 6A illustrates an implementation in which an audio outlet is used to direct audio generated from audio files to have a circumferential spatial characteristic, under an embodiment of the invention.
Figure 6B:
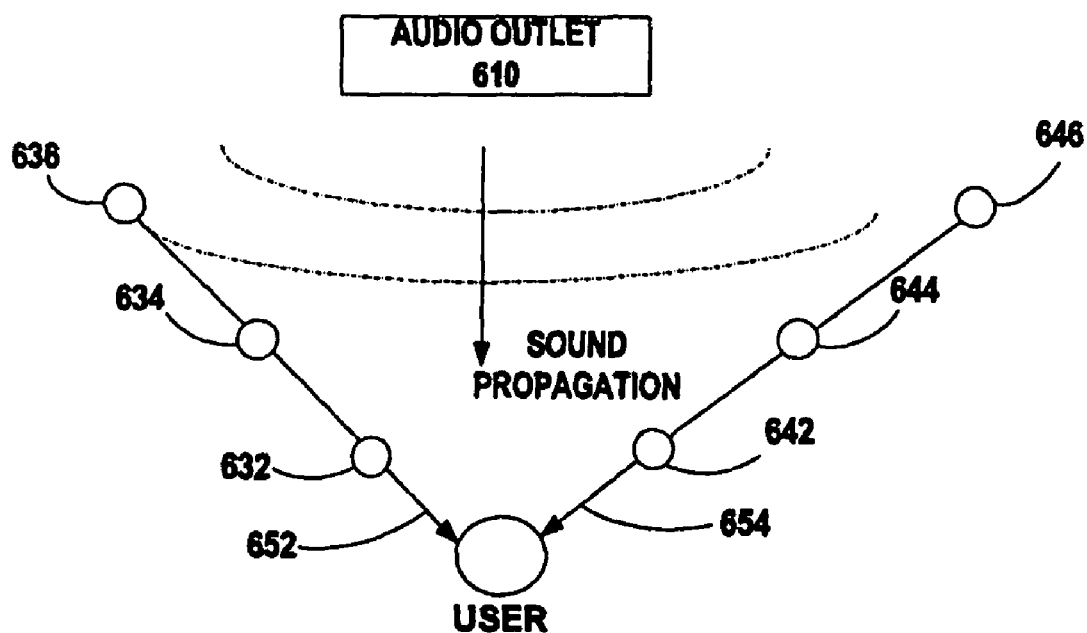
FIG. 6B illustrates another embodiment in which audio from individual audio items are manipulated to have perceived source positions that vary in distance and radial position.

FIG. 6A and FIG. 6B illustrate different implementations for one or more embodiments of the invention. In FIG. 6A, an audio outlet 610 corresponding to, for example, one or more speakers is positioned to direct audio generated from audio files in a particular collection. Sound waves corresponding to the generated audio from the different audio waves is directed from the audio outlet 610. However, the characteristics of the audio from individual audio items is manipulated to spatially distinguish the audio items to the user 620.

FIG. 6A illustrates an embodiment in which audio from individual audio items are phase-shifted through different communication channels of the outlets 610 to create a perception that the concurrently generated audio is spatially distributed. Each of the phase-shifted audio may be provided a different spatial characteristic that causes the user 620 to perceive the source position of the audio as being something different than the source position of the outlets 610. In FIG. 6A, perceived source positions 612, 614, 616, and 618 are shifted from the actual source position 615. Each of the perceived source positions 612, 614, 616, and 618 and the actual source position 615 may, from the perspective of the user 620, carry audio from one or more audio items in a given collection. For example, in one implementation, the user perceives a separate audio item from each of the locations 612, 614, 615, 616, and 618. The user may enter directional information to select audio. For example, the user 620 may enter directional information that identifies the audio item of interest. As another example, the user 620 may enter directional information that is general (e.g. leftward or rightward) Upon inputting the information, audio items that have perceived/actual source positions corresponding to the directional information may be played louder, while non-selected audio is muted. The user 620 can then make another selection.

FIG. 6B illustrates another embodiment in which audio from individual audio items are manipulated to have perceived source positions that vary in distance and radial position. In one implementation, audio generated from the audio items is phase-shifted to have one of two (or more) possible perceived arrival directions 652, 654. This may be accomplished at least in part by phase-shifting the audio from each audio item to have a desired radial position corresponding to the arrival direction 652, 654. Other audio manipulation techniques may be used to provide the audio from individual items with perceived distance along the arrival directions 652, 654. In one embodiment, for example, the volume of audio from individual audio items is manipulated so that audio from individual items seems further or nearer to the user 620. In this way, audio from different audio items may be concurrently outputted, with the audio from each item being provided with the particular spatial characteristic so that the user perceives the audio as originating from one of the perceived source positions 632, 634, 636 along the arrival direction 652, or one of the perceived source positions 642, 644, 646 along the arrival direction 654.

Under an embodiment, the use of distance indicates information to the user about the particular audio being outputted. For example, audio having a perceived distance that is further out may correspond to audio less frequently desired, or an audio item that is older.

Figure 7A:
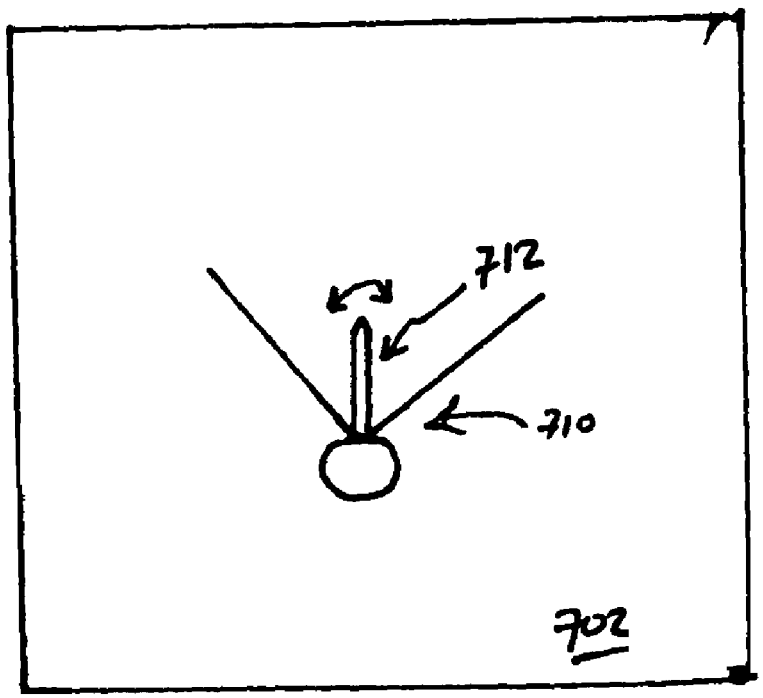
FIG. 7A and FIG. 7B illustrate different graphic user-interfaces for enabling the user to enter directional/position input to select outputted audio, under embodiments of the invention.
Figure 7B:
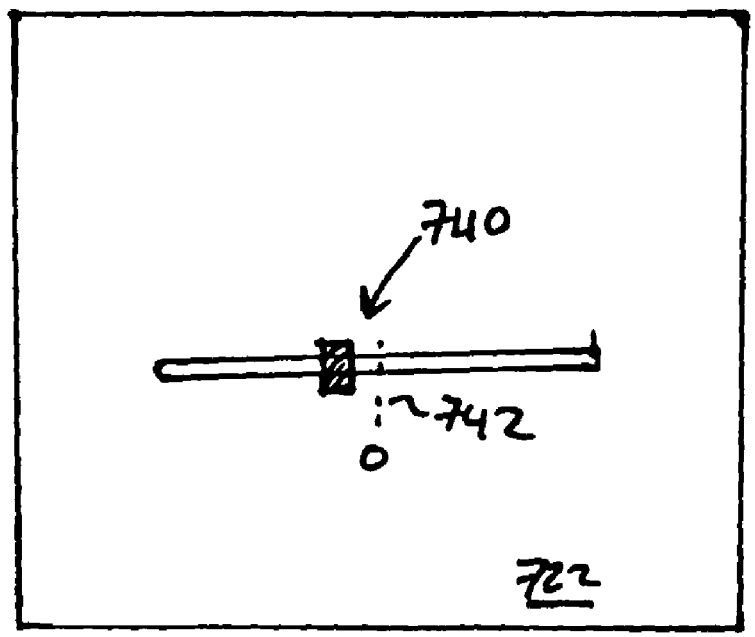

FIG. 7A and FIG. 7B illustrate two different graphic user-interfaces for enabling the user to enter directional input to select outputted audio, under embodiments of the invention. In FIG. 7A, the GUI 702 may take a form of a dial pad 710, that can be adjusted by a pointed or other GUI operation device to one of a plurality of radial positions. For example, the example provided by FIG. 7A permits dial 710 to be moved 90 degrees. Each radial setting 712 on the dial pad 710 may correspond to a selection of a subset of the audio files that are being simultaneously played back at a given moment. Each subset may include one or more audio data items. With each selection iteration of the user, if the desired audio of the user has still not been identified, the subset of audio items remaining may be played back using the full spectrum of differentiation provided by the dial pad 710.

FIG. 7B illustrates another GUI in the form of a slider 740 that enables a user to make leftward or rightward selections. When a collection of audio items are played to the user, the user may make a selection of candidates of interest by specifying, through the GUI, a leftward or rightward direction. In one embodiment, the magnitude of the slider from an origin 742 to either the left or the right may itself correspond to a separate selection. For example, movement of the slider to the far left may signify one subset of audio files being played back with the larger collection, while an intermediate position between the far left and origin 742 may signify another subset.

With regard to an embodiment such as described in FIG. 7B or elsewhere, an input mechanism or GUI may be configured to accept locational information in the form of distance or depth. Such information may be received in addition to user's radial selection. For example, the slider 740 in FIG. 7B may be aligned vertically to represent depth or distance perception of the user. The user can provide such depth/distance input using the vertically aligned slider. Numerous other possibilities for receiving such locational information from the user are also possible.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for enabling an end-user listener to select a desired audio, the method comprising:
    retrieving, by a processor, a collection of a plurality of audio items, wherein each audio item contains audio data and represents one listening unit as a whole for the end-user listener;
    concurrently generating, by the processor, audio from each audio item in the collection for the end-user listener to listen to the plurality of audio items at the same time, wherein the collection is divided into a plurality of subsets, and wherein concurrently generating audio from each audio item in the collection includes phase-shifting audio generated from each subset in the collection through two or more audio outlets to make audio generated from each of the plurality of subsets in the collection spatially distinguishable to the end-user listener from audio generated from remaining subsets in the collection, wherein making the audio spatially distinguishable comprises providing each audio item in the collection with a perceivable arrival direction or a source position that comprises a spectrum of spatial characteristics;
    detecting, by the processor, a spatial user-input corresponding to a subset in the collection; and
    selecting, by the processor, the subset in response to the detected user-input.

2. The method of claim 1, wherein detecting the spatial user-input includes detecting an input that includes locational information.

3. The method of claim 1, wherein detecting the spatial user-input includes detecting an input that includes directional information.

4. The method of claim 1, wherein phase-shifting audio generated from each of the plurality of subsets in the collection through two or more audio outlets to make audio generated from each subset spatially distinguishable to the end-user listener makes audio generated from each subset in the collection have at least one of (i) an arrival direction that is different from arrival directions of audio generated from the remaining subsets in the collection; and (ii) an apparent source position that is different from apparent source positions of audio generated from the remaining subsets in the collection.

5. The method of claim 4, wherein detecting the user-input includes detecting an input that includes directional information, and the method further comprises correlating the directional information to at least one of (i) an arrival direction of audio generated from a subset in the collection, and (ii) an apparent source position of audio generated from a subset in the collection.

6. The method of claim 1, wherein detecting the spatial user-input includes detecting an input that includes directional information indicative of audio generated from a subset in the collection.

7. The method of claim 1, wherein detecting the spatial user-input includes detecting an input that corresponds to at least one of location and direction.

8. The method of claim 1, wherein making audio generated from each of the plurality of subsets in the collection spatially distinguishable from audio generated from the remaining subsets in the collection includes making audio generated from each audio item in the collection spatially distinguishable from audio generated from every other audio item in the collection.

9. The method of claim 2, wherein detecting the input that includes locational information includes detecting at least one of a distance selection and a radial selection.

10. The method of claim 1, wherein retrieving the collection of a plurality of audio items includes retrieving a collection of voice memorandums.

11. The method of claim 1, wherein retrieving the collection of a plurality of audio items includes retrieving a collection of audio files stored in one or more memory mediums.

12. The method of claim 2, wherein detecting the spatial user-input includes providing the end-user listener with a graphic user-interface on which an object is provided to enable the end-user listener to enter the input with the locational information.

13. A system for enabling an end-user listener to select a desired audio, the system comprising:
    a memory storing instructions; and
    a processor, coupled to the memory, to execute the instructions to cause the system to
    retrieve a collection of a plurality of audio items from one or more storage mediums, wherein each audio item contains audio data and represents one listening item unit as a whole for the end-user listener;
    concurrently generate audio from each audio item in the collection for the end-user listener to listen to the plurality of audio items at the same time, wherein the collection is divided into a plurality of subsets, and each subset includes one or more audio items, spatially distinguish audio generated from each subset in the collection from audio generated from remaining subsets in the collection while concurrently generating the audio, wherein spatially distinguishing the audio generated from each subset in the collection from audio generated from remaining subsets includes phase-shifting audio generated from each of the plurality of subsets in the collection through two or more audio outlets, and wherein the audio generated from each subset in the collection is made spatially distinguishable from the audio generated from the remaining subsets in the collection using a corresponding perceivable arrival direction or a source position that comprises a spectrum of spatial characteristics, generate a user-interface to enable the end-user listener to provide user input with respect to one of the spatially distinguishable audios from the collection; and select the one of the spatially distinguishable audios from the collection based on the user input.

14. The system of claim 13, further comprising the storage mediums.

15. The system of claim 13, wherein the storage mediums correspond to the memory, and the collection of a plurality of audio items includes one or more audio items selected from a group consisting of: (i) a voicemail message, (ii) a voice memorandum, and (iii) a musical file.

16. The system of claim 13, wherein the user-interface includes a graphic user-interface that enables the end-user listener to enter an input that specifies at least one of distance and directional information in order to select spatially distinguishable audio by correlating the at least one of the distance and directional information with one or more spatial characteristics of audio generated from each subset or each audio item in the collection.

17. The system of claim 13, wherein the phase-shifting audio generated from each of the plurality of subsets in the collection spatially distinguishes audio generated from each audio item to make audio generated from each audio item in the collection have an arrival direction different from an arrival direction of audio generated from other audio items in the collection.

18. The system of claim 13, wherein the phase-shifting audio generated from each of the plurality of subsets in the collection spatially distinguishes audio generated from each audio item in the collection to make audio generated from each audio item have an apparent source position different from an apparent source position of audio generated from other audio items in the collection.

19. A computing device for enabling an end-user listener to select a desired audio, the computing device comprising:

one or more processors configured to:
retrieve a collection of a plurality of audio items from one or more storage mediums, wherein each audio item contains audio data and represents one listening item unit as a whole for the end-user listener;
concurrently generate audio from each of the plurality of audio items in the collection for the end-user listener to listen to the plurality of audio items at the same time, wherein the collection is divided into a plurality of subsets;
spatially distinguish each audio generated from each audio item in the collection from one another while concurrently generating the audio, wherein spatially distinguishing each audio generated from each audio item in the collection from one another includes phase-shifting each audio generated from each audio item in the collection through two or more audio outlets, and wherein the audio generated from each audio item in the collection is made spatially distinguishable from one another using a corresponding perceivable arrival direction or a source position that comprises a spectrum of spatial characteristics;
generate a user-interface to enable the end-user listener to provide user input with respect to one of the spatially distinguishable audios from the collection; and
select the one of the spatially distinguishable audios from the collection based on the user input.

20. The computing device of claim 19, further comprising a network interface connectable to a data network, wherein the one or more processors are configured to retrieve the collection of the plurality of audio items from the one or more storage mediums across the data network using the network interface.

21. The computing device of claim 20, further comprising a storage medium, wherein the one or more processors are configured to retrieve at least one of the audio items in the collection from the storage medium of the computing device.

22. A computer readable storage medium storing computer instructions which, when executed by a computer, cause the computer to execute a method for enabling an end-user listener to select a desired audio, the method comprising:

retrieving a collection of a plurality of audio items, wherein each audio item contains audio data, wherein each audio item contains audio data and represents one listening unit as a whole for the end-user listener;

concurrently generating audio from each audio item in the collection for the end-user listener to listen to the plurality of audio items at the same time, wherein the collection is divided into a plurality of subsets, and wherein concurrently generating audio from each audio item in the collection includes phase-shifting audio generated from each subset in the collection through two or more audio outlets to make audio generated from each of the plurality of subsets in the collection distinguishable to the end-user listener from audio generated from remaining subsets in the collection, wherein making the audio distinguishable comprises providing each audio item in the collection with a perceivable arrival direction or a source position that comprises a spectrum of spatial characteristics;

detecting a spatial user-input corresponding to a subset in the collection; and selecting the subset in response to the detected spatial user-input.

* * * * *